United States Patent [19]

Bretting

[11] 3,867,708

[45] Feb. 18, 1975

[54] TRANSMISSION SYSTEM WITH CABLE FOR TRANSMISSION OF HIGH FREQUENCY SIGNALS

[75] Inventor: Klaus Bretting, Heroldsberg, Germany

[73] Assignee: Kabel-und Metallwerke Gutehoffnungshutte Aktiengesellschaft, Hannover, Germany

[22] Filed: Oct. 4, 1973

[21] Appl. No.: 403,634

[52] U.S. Cl. .................................. 330/4.6, 330/4.5
[51] Int. Cl. .............................................. H03f 7/02
[58] Field of Search .............................. 330/4.5, 4.6

[56] References Cited

UNITED STATES PATENTS 3,012,203 12/1961 Tien .................................... 330/4.6

*Primary Examiner*—Rudolph V. Rolinec
*Assistant Examiner*—Darwin R. Hostetter
*Attorney, Agent, or Firm*—Ralf H. Siegemund

[57] ABSTRACT

A signal conductor is wound on a soft magnetic core with step-function permeability and extending for the length of the transmission line. A control conductor is also wound on the core and passes a parametric pumping signal, for example, at double the frequency of the information signal carrier frequency, to obtain continuous signal amplification along the transmission line and cable offsetting inherent line attenuation as it tends to affect the propagating information signal.

3 Claims, 5 Drawing Figures

PATENTED FEB 18 1975

3,867,708

TRANSMISSION SYSTEM WITH CABLE FOR TRANSMISSION OF HIGH FREQUENCY SIGNALS

BACKGROUND OF THE INVENTION

The present invention relates to transmission of electrical signals through communication cable, particularly for the transmission of high frequency signals from a transmitter to a receiver, including amplification of the signals to be transmitted along the transmission line.

Coaxial cables or the like as used for communication exhibit a certain amount of signal attenuation which depends on frequency within the frequency spectrum of the signals as transmitted. The attenuation is usually compensated by means of amplification of the signal along the transmission line, using indivdual amplifiers. Since the amplifiers exhibit some nonlinear signal distortion, the amplifier gain has to be the lower the more amplifiers operate in series on the transmission line. On the other hand, input and output threshold levels of the amplifiers have to be the higher the more amplifiers are connected in series because each amplifier produces and amplifies some noise. In other words, the S/N ratio deteriorates, usually with increasing number of amplifiers employed.

These mutually opposing conditions can be depicted in a diagram by means of which one can determine the maximum possible length of the transmission line under specified component and systems parameters. Thus, the range of a cable network using amplifiers as inserted in descrete points, can be determined by means of such a diagram which shows that the range is limited due to existing and permitted nonlinear distortions and the permitted noise level.

It has to be considered, however, that the theoretical number of amplifiers as taken from such a diagram, cannot be used in practice. Rather, only about half that number was found feasible in practice. By way of example, a transmission line with 3 db/100 m attenuation for 230 MHz as upper frequency limit has a maximum transmission range of 50 km, with amplifiers interposed every 800 m. Thus, such a transmission line is limited in range indeed, which, in turn, requires insertion of repeaters for longer transmission lines and systems.

SUMMARY OF THE INVENTION

It is an object of the present invention to provide for a transmission system using a cable constructed and operated for communication of signals which can be transmitted over such a cable essentially without limit as to range.

It is another object of the present invention to provide for a transmission system on a low noise level basis without requiring repeaters at the end of a given range, shorter than the total length of the transmission path needed.

In accordance with the preferred embodiment of the invention it is suggested to provide the information signal conductor around a core of soft magnetic material, and to provide also a control signal conductor around that core. The latter conductor is biased electrically on a composite a.c.-d.c. basis to change the effective permeability of the core in particular relation to the information signal excursions as they propagate in the signal conductor. Particularly, the permeability is to decrease on or near information signal peaks, the permeability is to increase on or near zero crossings of the information signal.

It should be noted that the principle of parametric amplification is known in that the reactance in microwave tubes is periodically by a "pumping" signal. Particularly, the capacitance of, or in the tube, is changed periodically and at such points in times (phase) that the information signal is boosted above internal attenuation to obtain amplification. Parametric amplification has the advantage of compensating attenuation without introducing noise.

The present invention provides communication signal transmission by means of a cable operated throughout its length in a parametric amplification mode for compensating the line attenuation therealong in a manner which does not introduce noise so that the signal level available at the output, is the same as the input signal level and under substantially similar S/N conditions. The principle of the invention is to provide parametric pumping along the entire length of the cable using a soft magnetic cable core for inductive storage of pumping energy which is transferred to the information signal amplitudes, as they propagate in and along the respective conductor.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages therof will be better understood from the following description taken in connection with the accompanying drawings in which:

Proceeding now to the detailed description of the drawings, FIG. 1 shows an elongated cable core 1 made of soft magnetic material on the base of iron and nickel. A signal conductor 2 is wound helically upon that core 1, and a control conductor 3 is helically wound on top of conductor 2. The two conductors 2 and 3 are insulated relative to each other. Reference numeral 10 denotes schematically an outer shield serving as outer conductor of a coaxial system.

Figure 1:
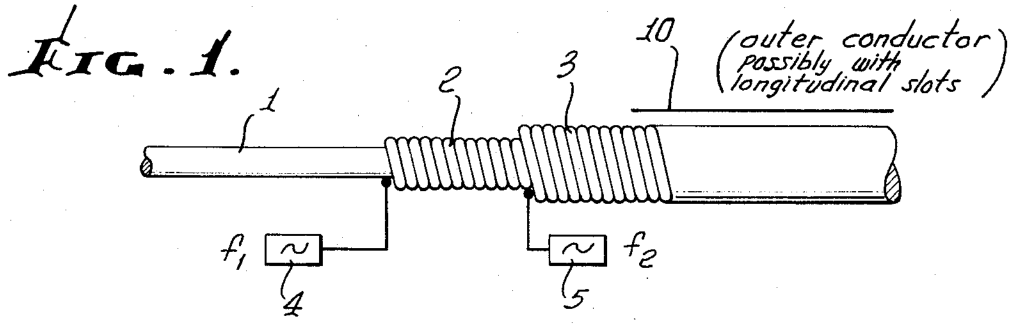
FIG. 1 shows schematically a side view of a cable portion with system component for a transmission system in accordance with the preferred embodiment of the invention.

As shown schematically in FIG. 1, a source 4 of information signals feeds signals at a frequency $f_1$ to conductor 2. The signal frequency $f_1$ is understood to be a carrier frequency whereby the information proper is contained in one or two side bands. A transmitter 5 feeds control signals at a pumping frequency $f_2$ to conductor 3. In the illustrated example, the pumping frequency $f_2$ is exactly twice the value of carrier frequency $f_1$ of the information signal band. The carrier frequency $f_1$ and the pumping frequency $f_2$ are preferably derived from a common normal or standard to obtain coherency of the respective waves, i.e., for slaving the pumping frequency to the carrier (or vice versa) as far as phase is concerned. Conductors 2 and 3 are dimensioned so that the two signals propagate in the respective conductors at similar speed. The return path for both signals runs through conductor 10.

One can readily see that preferably only the inner conductor of a coax system is provided as a coil with inductive coupling to a pumping signal conductor. The outer conductor 10 can be of conventional construction.

Figure 2:
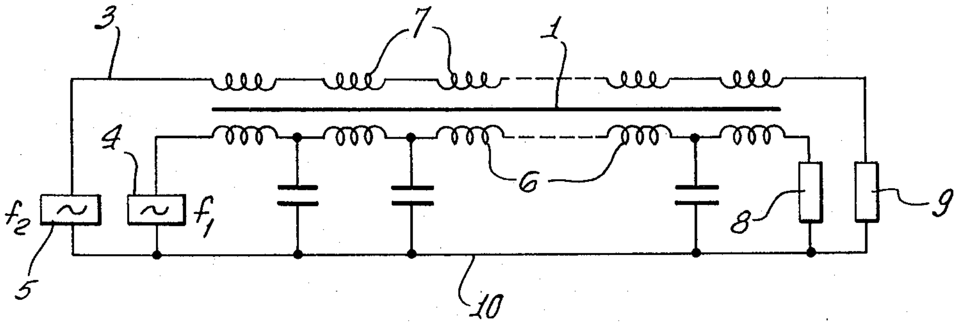
FIG. 2 is an equivalent circuit of the system of FIG. 1.

The same cable is depicted again in FIG. 2 but on the basis of an equivalent circuit. Signal sources 4 and 5 are again shown as blocks. The two conductors, however, are shown as incremental inductances, 6 for conductors 2; 7 for conductor 3, and respectively connected in series. The cable core 1 acts as a transformer core for each and all pairs of inductances as they are coupled to each other due to coaxial coiling of the two conductors. Reference numerals 8 and 9 denote terminating resistors for the two conductors 2 and 3, whereby particularly block 8 can be interpreted schematically as the information signal receiver in the system. Reference numeral 10 denotes again the return path, and reference numeral 11 shows the (incremental) capacitances between the conductor 2 and return path 10 of this transmission line.

Figure 4B:
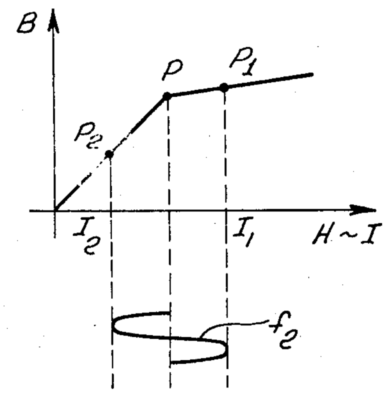
FIGS. 4a and 4b are graphs for illustrating the magnetic properties of the cable core as shown in FIG. 1 and supplemented for illustrating operational details of the system in accordance with the invention.
Figure 4A:
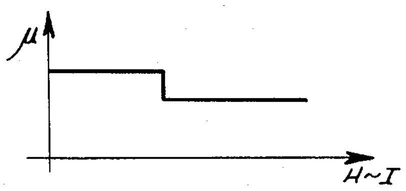

Turning briefly to FIG. 4a, the graph illustrates the permeability of core 1 as a function of a magnetizing field H. As can readily be seen, the permeability is to exhibit a pronounced step for a particular magnetic field (H) as it tends to magnetize the core. That field H generally corresponds to a particular magnetizing current I flowing in this instance in either or both conductors as wound on core 1.

FIG. 4b is shown in vertical alignment with FIG. 4a and shows magnetic induction B of core 1 and also as a function of magnetizing field or force H or the corresponding magnetizing current I. The B vs. I characteristic shows a knee point P corresponding to the step in the permeability.

The device and structure in accordance with FIGS. 1, 2 and 4 operates as follows:

The conductor 3 as receiving a control signal at pumping frequency $f_2$ receives also a superimposed d.c. current for biasing the core. Particularly, this d.c. current is chosen so that the effective permeability has been shifted to point P. Half waves of one polarity of the pumping and control signal reduce the effective magnetization of the core 1 as between points P and $P_1$. Half waves of opposite polarity of the pumping signal shift the magnetization of core 1 from point P to point $P_2$. Each zero crossing in the pumping signal wave causes the permeability of the core to switch. Switching is, of course, a local effect and does not effect the entire core in each instance. Thus, the core has one permeability of certain length alternating with zones of the other permeability and the dividing lines define the locations of switching and propagate along the length of the cable with the propagation of the pummping signal waves.

Figure 3:
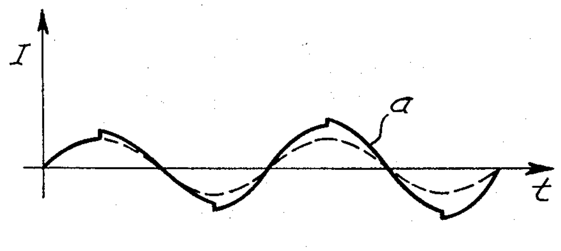
FIG. 3 is a graph wherein information signal current is plotted against time for illustrating operation and effect of the system in accordance with the present invention.

Hence, the effective permeability of the core is switched back and forth between the upper and lower values of the step characteristics (FIG. 4a). The effective core magnetization, flux B, thus, varies between point $P_1$ and $P_2$ along two branches of a bent characteristics (FIG. 4b). The phase and frequency of pumping frequency $f_2$ are particularly chosen relative to phase and frequency of the information signal. Whenever the information signal excursions reach an excursion peak, i.e., a maximum or a minimum, the permeability of the core 1 is to change. That change is to occur rapidly, i.e., witihin a period which is short relative to the information signal frequency. The inductance of the cable is, therefore, reduced in these instants so that, so to speak, the energy content of the inductance is "squeezed out," resulting in a signal current increase. Thus, the information signal amplitude is effectively increased in these extremeties of the information signal curve as depicted in FIG. 3. That current increase can be proportioned so as to compensate the transmission line attenuation.

The inductance is returned to the previous value (by operation of the pumping signal) whenever the information signal passes through zero, so that there is no reversal of flow of energy from the signal conductor into the inudctive system. Therefore, the zero crossings of the pumping signal are to coincide alternatingly with excursion peaks and zero crossings of the information signal, and the phase of the pumping signal is such that, on basis of the existing d.c. magnetization, the permeability is always reduced on the information signal excursions.

The entire effect can be explained as follows: The transmission line inductance of this particular transmission line can be expressed by the following equation:

$$L = w^2(\mu \cdot F/L)$$

wherein $L$ is the inductance; $w$ the number of conductor turns; $\mu$ is the permeability, and $F$ and $l$ are respectively cross section area and length of the "coil" as established by the coiled conductor 2. THe permeability varies in accordance with the characteristics of FIG. 4a and is, therefore, a function of time, the variations occurring at pumping frequency $f_2$. That variation is produced by the combined effect of d.c. bias and pumping signal varying the effective pre-magnetization current between values $I_1$ and $I_2$ (FIG. 4b), whereby particularly upon change from $I_2$ to $I_1$ the permeability drops at the zero crossings of the pumping signal by the step shown in FIG. 4a. Upon proper adjustment of phase and frequency of the pumping signal in relation to the information signal, one can obtain a current flow in the signal conductor 2 in accordance with trace of FIG. 3. That operation could lead to a stepwise increase in the signal amplitude which, however, is offset by the attenuation.

As stated above, the pumping signal frequency is twice the information signal frequency in the depicted example. That relation, however, is not essential. Decisive is, that the sum of current increases resulting from an effective permeability change from higher to lower value is larger than the sum of any current decreases that occur on the reverse permeability change. This then requires merely that current increasing permeability switchings occur at least to some extent at or near the information signal peak excursions, while current decreasing permeability switchings occur predominantly at or near the zero crossing of the information signal.

Upon selecting, e.g., $f_2 = 4 f_1$, two additional permeability switchings would occur within an information signal wave or cycle, but the resulting current decreases and increases will offset each other for no net effect. Therefore, $f_2 = 2f_1$ is not mandatory, but preferred.

Also, the information signal band width may make it desirable to provide particularly for adequate separation between the two signal frequencies.

The invention can be practiced for all kinds of communication cables. The invention is particularly of interest when the information signal frequency exceeds 100 MHz. Particular application, for example, can be seen in community TV antenna systems or the like, wherever the transmission path may be of substantial length.

In the regular field of application, the outer conductor 10 of a coax cable will be of regular construction serving, for example, also a grounded shield. However, the invention can also be practiced with advantage in the field of so-called radiating coax cables. These cables have an outer conductor with slot through which Hf energy is radiated in particular relation to the run of the cable. This possibility is indicated by labelling in FIG. 1. A cable with slotted outer conductor is, for example, disclosed in U.S. Pat. No. 3,681,717.

Such a radiation, of course, is effective as attenuation, and pumping as described replenishes the information signals. Such cable is used, for example, for control of vehicles travelling therealong. The effective amplification must be, of course, higher in this instance as compared with mere compensation of regular attenuation the case of a regular coax cable.

The invention is not limited to the embodiments described above but all changes and modifications thereof not constituting departures from the spirit and scope of the invention are intended to be included.

I claim:

1. In a signal transmission system with a transmitter for an information signal at a first frequency and a cable for transmitting the information signal, the improvement comprising:

a magnetic core having magnetic permeability which exhibits a step; a first signal conductor wound on said core and connected to said transmitter; a second conductor wound also on said core; and a source for a control signal connected to said second conductor for magnetically biasing and controlling the core and having a d.c. biasing component and a variable component of a second frequency having amplitude and being adjusted in phase and frequency relative to the first frequency, so that the effective permeability of the core in any point thereof is reduced upon occurrence of an information signal peak and increased upon occurrence of information signal zero crossings..

2. In a signal transmission system as in claim 1, wherein the first signal conductor is the inner one of a coaxial high frequency cable, having also an outer conductor.

3. In a signal transmission system as in claim 2, wherein the outer conductor has an axial slot.

* * * * *